United States Patent
Williams

(10) Patent No.: US 9,914,429 B2
(45) Date of Patent: Mar. 13, 2018

(54) VEHICULAR CHILD RESTRAINT AND CHILD PROTECTION SYSTEM

(71) Applicant: Glen Fowler Williams, Mount Royal (CA)

(72) Inventor: Glen Fowler Williams, Mount Royal (CA)

( * ) Notice: Subject to any disclaimer, the term of this patent is extended or adjusted under 35 U.S.C. 154(b) by 0 days.

(21) Appl. No.: 14/544,061

(22) Filed: Nov. 21, 2014

(65) Prior Publication Data

US 2016/0144823 A1    May 26, 2016

(51) Int. Cl.
- *B60R 22/14* (2006.01)
- *B60N 2/28* (2006.01)
- *B60R 22/10* (2006.01)
- *B60R 22/28* (2006.01)

(52) U.S. Cl.
CPC ............ *B60R 22/14* (2013.01); *B60N 2/2839* (2013.01); *B60N 2/2866* (2013.01); *B60R 22/105* (2013.01)

(58) Field of Classification Search
CPC ..... B60R 22/14; B60R 22/105; B60N 2/2839; B60N 2/2866
See application file for complete search history.

(56) References Cited

U.S. PATENT DOCUMENTS

| | | | |
|---|---|---|---|
| 3,232,665 A * | 2/1966 | Von Wimmersperg | B60N 2/2839 297/471 |
| 3,300,247 A * | 1/1967 | Marks | B60R 22/14 297/468 |
| 3,424,497 A * | 1/1969 | Brilmyer | B60N 2/2839 165/903 |
| 4,159,127 A * | 6/1979 | Czernakowski | B60N 2/2839 280/751 |
| 4,341,422 A * | 7/1982 | Cunningham | B60N 2/2839 297/391 |
| 4,502,732 A * | 3/1985 | Williams | B60R 22/14 297/471 |
| 4,591,208 A * | 5/1986 | McDonald | B60N 2/2806 297/216.11 |
| 4,643,474 A * | 2/1987 | Wise | B60N 2/2839 254/250 |
| 4,687,255 A * | 8/1987 | Klanner | B60N 2/2803 297/216.11 |
| 4,765,685 A * | 8/1988 | Sudoh | B60N 2/286 297/256.15 |
| 5,016,915 A * | 5/1991 | Perry | B60R 22/14 280/808 |
| 5,161,824 A * | 11/1992 | Li | B60R 22/14 280/801.1 |
| 5,213,366 A * | 5/1993 | Sweger, Jr. | B60R 22/14 116/212 |
| 5,275,468 A * | 1/1994 | Vacanti | B60R 22/14 297/482 |

(Continued)

FOREIGN PATENT DOCUMENTS

DE         2621479 A1 *  11/1976   ........... B60N 2/2839

*Primary Examiner* — David R Dunn
*Assistant Examiner* — Tania Abraham

(57) ABSTRACT

A forward-facing child restraint and a child restraint system providing superior collision protection. The restraint and the system are for use in a vehicle having a lap belt and a shoulder belt. The child restraint system comprises a restraint which may be used with a booster seat, independently of a booster seat or associated with a booster seat.

11 Claims, 10 Drawing Sheets

(56) References Cited

U.S. PATENT DOCUMENTS

| | | | | |
|---|---|---|---|---|
| 5,335,957 A | * | 8/1994 | Golder | B60R 22/14 |
| | | | | 297/482 |
| 5,507,558 A | * | 4/1996 | Kain | B60N 2/2866 |
| | | | | 297/250.1 |
| 6,086,158 A | * | 7/2000 | Zeoli | B60R 22/024 |
| | | | | 297/482 |
| 6,322,149 B1 | * | 11/2001 | Conforti | B60R 22/024 |
| | | | | 297/482 |
| 6,412,866 B2 | * | 7/2002 | Koyanagi | B60N 2/2812 |
| | | | | 297/250.1 |
| 7,086,703 B1 | * | 8/2006 | Jones | B60R 22/14 |
| | | | | 297/464 |
| 7,318,606 B1 | * | 1/2008 | Berke | B60R 22/14 |
| | | | | 280/801.1 |

* cited by examiner

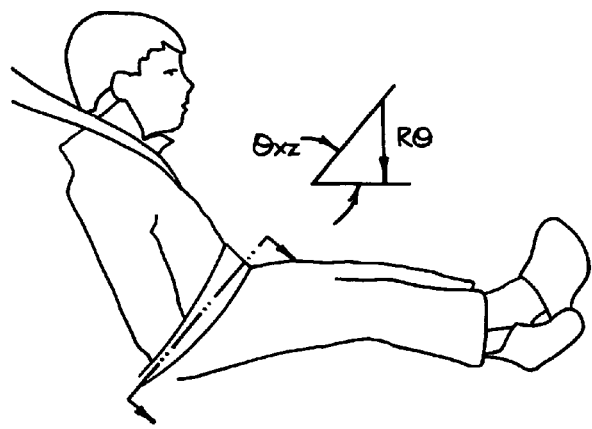
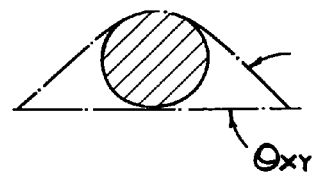
Fig. 5a             Fig. 5b
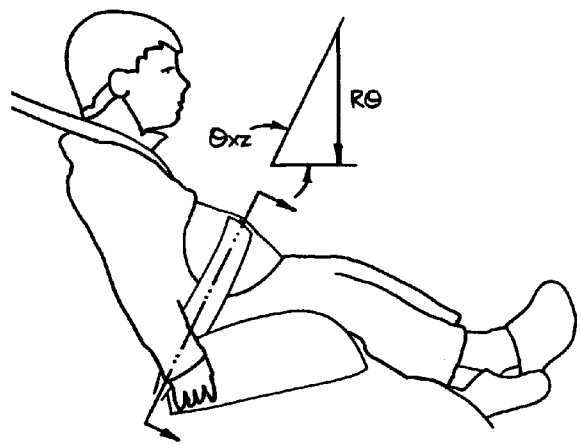
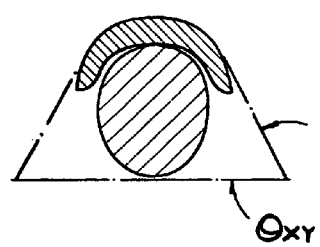
Fig. 6a             Fig. 6b

VEHICULAR CHILD RESTRAINT AND CHILD PROTECTION SYSTEM

This invention was not made with the involvement of any research funded by the federal government of the United States of America or any of its agencies, and consequently the US government has no rights to the invention.

CROSS-REFERENCE TO RELATED APPLICATIONS

This application claims the benefit of provisional patent application Ser. No. 61/907,495 filed Nov. 22, 2013.

REFERENCES CITED

U.S. Patent Documents

| | | | |
|---|---|---|---|
| U.S. Pat. No. 3,232,665 | A | 1966 Feb. 1 | Wimmersperg |
| U.S. Pat. No. 4,033,623 | A | 1977 Jul. 5 | Thary et al. |
| U.S. Pat. No. 4,502,732 | A | 1985 Mar. 5 | Williams |
| U.S. Pat. No. 4,643,474 | A | 1987 Feb. 17 | Wise et al. |
| U.S. Pat. No. 4,653,809 | A | 1987 Mar. 31 | Czernakowski et al. |
| U.S. Pat. No. 4,687,255 | A | 1987 Sep. 18 | Klanner et al. |
| U.S. Pat. No. 5,178,439 | A | 1993 Jan. 12 | McCracken |
| U.S. Pat. No. 5,335,957 | A | 1994 Sep. 9 | Golder |
| U.S. Pat. No. 5,507,558 | A | 1996 Apr. 16 | Kain |
| U.S. Pat. No. 6,174,032 | B1 | 2001 Jan. 16 | Conaway |
| Des. 291,032 | S | 1987 Jul. 28 | Sauter et al. |
| Des. 324,611 | S | 1992 Mar. 17 | Sedlack |

TECHNICAL FIELD

This invention relates to a child protection system for use in a vehicle. More specifically, it relates to an improved child restraint to co-ordinate with a lap belt and a booster seat in a vehicle.

BACKGROUND

Automobile seatbelts, like airbags, were designed for adults. Infant carriers and car seats protect infants and children up to approximately four years.

At four a child has outgrown her car seat, but use of an adult seatbelt alone can produce life-threatening abdominal and spinal injuries.

The current solution for children 4 to 10 year of age is the belt-positioning booster seat. It elevates the child to position the adult seatbelts to mimic their paths across the body of an adult, with the lap seatbelt passing across the spine on either side of the child's pelvis.

The technique has resulted in a preoccupation with the static fit of the lap seatbelt, disregarding the unlikelihood the static belt fit will be preserved in a collision.

The most egregious aspect of the preoccupation with static fit is the failure to protect the child against the lap seatbelt itself.

In a collision the lap seatbelt can slip over the child's pelvis, allowing her to slip forward and 'submarine' under the belt, with the brunt of the collision forces focused on the narrow band of seatbelt across her vulnerable abdomen. She is thus at risk of lap seatbelt-inflicted internal trauma including the evisceration of internal organs and the stretching and permanent rupture of the spinal cord due to the bending of the lumbar spine about the seatbelt acting as a fulcrum.

Proof of the relative ineffectiveness of belt-positioning booster seats is provided by a National Highway Traffic Safety Administration (NHTSA) study published in July 2010 which reported a 14-percent reduction in overall injuries for children in booster seats relative to children in adult seatbelts alone.

This modest statistical margin of safety is largely due to increased use of the shoulder belt rather than any inherent quality of the belt-positioning booster seat itself. It is offset by a large increase in the incidence of head injuries with use of the belt-positioning booster seat due to the child's seating position being both elevated and advanced in order to achieve a proper 'static' belt fit.

Our understanding of the mechanics of automobile collisions has evolved over the thirty years since the invention of the booster seat, and passenger vehicles have gone from having a body on a rigid frame to a unibody construction, designed to absorb the energy of a collision by a progressive collapse.

To be most effective, restraints must exploit this advance in automotive design and couple passengers to the vehicle as tightly as possible to 'ride down' a crash with the vehicle to maximize the benefit of its energy-absorbing capacity.

The benefit is lost to the extent to which the passengers are free to move in a collision in advance of their own impact with either the lap seatbelt or the interior of the vehicle, whether it is due to the design of the restraint, its interaction with the vehicle interior or its misuse. Excessive free movement in a collision is an inevitable by-product of the design of the belt positioning booster seat.

By both elevating and advancing the child, the belt positioning booster seat extends the length of the lap seatbelts. In a collision the lap seatbelts rotate clockwise about their anchors with compression of the vehicle seat, degrading static fit, and exposing the fallacy of static lap belt fit.

A majority of users of belt-positioning booster seats misuse them misrouting one or both belts, accepting a child's poor posture or not adjusting the lap seat belt snug about the child. Almost all cases of misuse result in excessive belt slack, increasing forward movement which, in addition to further degrading the static fit, results in sharp increases in pelvic loading by the belt.

The focus on static belt fit is based on an assumption that a child's pelvis is a scaled-down version of an adult pelvis; in reality the pelvis of a child is not well suited to either locating the belt, being proportionally smaller and lower profile than an adult pelvis, or assuming the brunt of collision forces concentrated in the lap belt entirely on its own, being composed significantly of elastic cartilage.

Maintaining proper pelvic orientation is thus essential in a collision: when a child restrained by a lap seatbelt slouches, her pelvis undergoes a counter-clockwise rotation, reducing the height and decreasing the vertical slope of the forward edges of the iliac spines on either side of the pelvis, thus diminishing the capacity of the spines to engage with either a seatbelt or restraint to absorb collision forces and resist submarining.

The forward edge of either iliac spine may be viewed as a 'ramp', whereby the outcome of a collision, in terms of whether a seatbelt or restraint is either held captive in front of the pelvis as in FIG. 11, or rides up the 'ramps' to allow the pelvis to rotate and the child to submarine, is a consequence of:

(i) the magnitude of the downward reaction force (Rθ) FIG. 7 exerted by the belt or restraint on the hips relative to
(ii) the inertial force of the child's lower body tending to make the child slip forwards under the belt and
(iii) the angle of the 'ramps'.

Despite the emphasis on static lap seatbelt fit with its implicit recognition of the risk of lap seatbelt-inflicted internal trauma, the belt-positioning booster seat makes no provision to protect the child against the lap seatbelt in a collision.

Thus it is imperative with a belt-positioning booster seat that the shoulder belt protect the child against the lap seatbelt by sharing the load of the collision forces.

Both backless and high-back belt-positioning booster seats increase the likelihood of a proper shoulder seatbelt fit in a collision, but a proper shoulder belt static fit does not guarantee proper routing under dynamic collision conditions.

Where the fit of a shoulder belt is dependent upon a plastic feature of a high-back booster seat there is no guarantee that collision forces will not make the belt revert to the original path determined by the seatbelt geometry of the vehicle.

Preserving shoulder belt fit in a collision is essential to protecting the child against the lap seatbelt; it is not a guarantee a child will not submarine or be otherwise injured by the lap belt.

Although there is a correlation between static lap seatbelt fit and belt angle, it is the angle assumed by the lap seatbelt when the child and her restraint are thrown forward in a collision that is determinant of the outcome.

Lap Seatbelt Geometry: Vertical Angle

A lap seatbelt restrains an adult passenger by exerting reaction forces on her body both in direct opposition to forward collision forces and downward into the vehicle seat.

In a collision FIG. 7 the force of the inertia (I) of a passenger's body acting on the lap seatbelt translates into a tension (T) and a downward reaction force (Rθ) in the lap seatbelt.

This downward reaction force is essential to ensuring the belt does not ride up over the pelvic spines to penetrate the soft abdomen.

The downward reaction force in the lap seat belt is proportional to the angle (θ) between the seat belt and the horizontal collision forces and is counteracted by a reaction force (RN) normal to the surface of the seat, resulting in a proportional friction force (FRN) opposing the tendency to slide forward.

The collision force acting horizontally on the pelvis due to the inertia of the legs is thus reduced by the gripping action of the seatbelt or restraint on the thighs and the frictional force FRN.

The performance of a lap seatbelt or restraint is thus dependent upon the angle (θXZ) the belt assumes FIG. 5A in the X-Z plane in relation to the horizontal when subjected to collision forces, and that angle is determined by the point of contact of the lap seatbelt on the passenger relative to the location of the seatbelt anchors.

The steeper the angle θ of the belt, the greater is the force Rθ exerted downwards on the hips and upper thighs as is the corresponding frictional force FRN.

In a collision a passenger moves forward and downwards with compression of the vehicle seat by the downward reaction force in the lap seatbelt and there is a corresponding clockwise rotation of the lap seatbelts about their anchors, resulting in a shallower angle θ.

Too shallow an angle and there is not enough downward pressure in the belt Rθ on the hips and a risk inertial forces will make the passenger submarine, exposing the abdomen to the lap seatbelt.

The child passenger is more dependent upon the preservation of a taller belt angle to resist the tendency to submarine than an adult because her pelvis lacks the height, definition and integrity to reliably 'hook' the belt.

The pelvis of a child is also unable to assume the brunt of the forces of a collision on its own. For the pelvis to play its role in protecting the viscera of the child, it depends upon sufficient downward reaction force in the lap seatbelt to grip the upper thighs, augmenting the friction forces opposing her tendency to slide forward and the pelvis to rotate counter-clockwise.

By elevating and advancing the child, belt-positioning booster seats extend the lap seatbelts, increasing free forward movement in a collision, degrading belt angle and reducing the magnitude of the downward reaction force essential to stabilizing the pelvis.

Lap Seatbelt Geometry: Adjustment

A snug lap seatbelt adjustment is essential to maintaining proper pelvic orientation and limiting the loads imposed on the pelvis in a collision. In a collision the child will continue to travel at the original velocity of the vehicle, heedless of its deceleration, until she collides with a seatbelt, child restraint or the vehicle interior, producing a spike in the loading of the pelvis.

A restraint should minimize this useless movement by coupling the child to the vehicle as tightly as possible so as to 'ride down' the crash with the vehicle to the fullest extent possible, participating in its more gradual deceleration due to its capacity to absorb the energy of the collision.

A snug seatbelt adjustment is more easily achieved the more closely the lap belts are aligned (in the X-Y plane) with the direction of the collision forces (the greater is angle θxy) FIGS. 5B, 6B.

Ideally lap seatbelt anchor points should be no further apart than the pelvic width of the passenger in order to achieve a tight lap seatbelt adjustment; a four year old in a vehicle is at a disadvantage with a pelvic width half that of an adult.

A snug lap seatbelt is particularly important in a sports utility vehicle (SUV) which does not have the same collision energy absorbing capacity as a passenger car by virtue of its rigid chassis construction.

PRIOR ART

Prior to the belt-positioning booster seat, it was widely appreciated a child's body could not withstand the concentrated pressures resulting from direct restraint in a forward collision by the adult lap seatbelt alone.

Earlier child restraints for booster-age children restrained the child primarily through direct opposition to horizontal collision forces, and were in themselves energy-absorbing.

There was no manifest appreciation of the mechanics of the lap seatbelt, including the effect of the downward reaction force the belt applies to the hips and thighs in a collision, the lap seatbelt being considered reserved for adult use.

Impact shields such as U.S. Pat. No. 3,232,665 to Wimmersperg and U.S. Pat. No. 4,033,623 to Thary preceded the shield booster and were intended to distribute the kinetic energy of the child over a broad area of her body when she was thrown forward in a collision.

The impact surface was an integral part of impact shield type restraints and they enclosed the child, resting on the vehicle seat to permit a degree of freedom of movement within their interiors, thereby isolating the child from the downward reaction force of the lap seatbelt.

This sometimes resulted in the child sliding forward to 'submarine' under the restraint in a collision.

The shield booster comprised a booster seat to elevate the child and a movable shield in a fixed but adjustable relationship to the child. The shield was affixed mechanically to the booster in various ways which isolated the child from the downward reaction force in the lap seatbelt, including sliding in diagonal channels on either side as in the case of U.S. Pat. No. 5,507,558 to Kain and U.S. Pat. No. Des. 324,611 to Sedlack or hinged or pivoting as in the case of U.S. Pat. No. 4,643,474 to Wise and U.S. Pat. No. Des. 291,032 to Sauter.

In U.S. Pat. No. 4,687,255 to Klanner and U.S. Pat. No. 4,653,809 to Czernakowski, the shield pivoted about an axis forward of its point of contact with the child whereby the forward translation of the child would open the aperture of the shield, increasing the likelihood of submarining.

U.S. Pat. No. 4,502,732 to Williams describes a shield-type child restraint which is a load-spreader. It is deformable, to spread collision forces generally over the torso and thighs.

The thin liner of 'suitable cushioning material' (col. 3 line 66) of Williams is only for comfort and would compress to a negligible thickness in a collision.

In contrast, the present invention is a belt-positioner. It is rigid, and its substantial thickness is configured to displace outwards and position the lap seat belt to optimize seat belt geometry including the vertical angle of the seat belt in a forward collision.

The liner of the present invention comprises a rigid stiffening member to transfer collision forces laterally to the bony hips and pelvic spines on either side of the child's body.

The restraint of Williams is flexible in a lateral direction and does not appreciably alter seat belt geometry, nor does it support the role of the child's pelvis.

In use, the restraint of Williams assumes the child to be restrained by only the lap seat belt, without either a booster seat or a shoulder seat belt, and is directed at restraining the child against forward rotation of the upper body about the hips.

In contrast, the present invention is intended for use both with a booster seat and with a shoulder seat belt.

Shoulder belt positioners, of which U.S. Pat. No. 5,178,439 to McCracken, U.S. Pat. No. 5,335,957 to Golden and U.S. Pat. No. 6,174,032 B1 to Conaway are examples, are intended primarily to lower the vehicle shoulder belt for a smaller child.

Shoulder belt positioners may nominally increase the area over which the forces in the vehicle seatbelts act upon the child's upper torso but they put the child at risk by coupling the lap and shoulder belts. In restraining the upper body of the child in a collision, the shoulder belt will pull up on the lap belt thereby reducing the downward reaction force available to restrain the child to prevent her from submarining.

Drawbacks and Limitations of Known Restraint Systems:

The following relates particularly to the belt-positioning booster seat:

1. The contradiction inherent in the notion of static belt fit is that belt-positioning booster seats adapt adult seat belt geometry to a child to produce the 'fit' by elevating and advancing her, but by doing so they extend the length of the lap seatbelt, thereby increasing free forward movement in a collision and degrading belt fit;
2. This free movement results in a reduction of the angle of the seatbelt and a counter-clockwise rotation of the pelvis, both of which undermine the limited capacity of the child's pelvis to hook the lap seatbelt to prevent submarining and penetration of the abdomen by the lap seatbelt;
3. By elevating and advancing the child, belt-positioning booster seats increase the likelihood of head injury in a collision due to impact with the rear of the front seat;
4. By increasing the free movement of the child in a collision belt-positioning booster seats reduce the extent to which the child is protected by the capacity of the vehicle to absorb the energy of the collision;
5. Belt-positioning booster seats restraint the child through direct contact with the adult lap seatbelt so when the belt slips over the pelvic spines and the child submarines, she has no protection from collision forces concentrated on her vulnerable abdomen by the narrow, inflexible lap belts;
6. The performance of a belt-positioning booster seat is undermined entirely by a failure of the shoulder seatbelt to provide a proper dynamic fit. Whether it is due to an off-centre collision, an improper fit, misuse or the failure of a plastic belt-positioning feature when subjected to collision forces, a child can slip away from her shoulder belt to jack-knife over her seatbelt. The lap seatbelt is capable of eviscerating her internal organs and then going on to provide the fulcrum for the extreme bending of her flexible lumbar spine and consequent rupture of her spinal cord;
7. Belt-positioning booster seats are overly subject to misuse including the misrouting of the seatbelt, acceptance of a child's poor posture or failure to adjust the lap seat belt snug about the child. This results in excessive belt slack and increased forward movement producing sharp increases in pelvic loading by the lap seatbelt;
8. The performance of a given belt positioning booster seat is subject to variations in lap and shoulder seatbelt anchor location and the seated height of the child; confusion on the part of parents increases the likelihood of a child being injured by the lap seatbelt because of a poor initial choice of restraint, its transfer to another vehicle or the growth of the child;
9. The failure of belt-positioning booster seats to provide a significant margin of protection in real-life vehicular collisions discourages the development of standards governing their design, weakening legislation mandating their use and resulting in low compliance.

In light of the drawbacks and limitations described in existing belt-positioning booster seats, one or more aspects of the present invention offers several advantages in providing a restraint that:

adapts a child's diminutive proportions to vehicle interiors intended for adult passengers such that its performance is not unduly affected by variations in the geometry of vehicle lap and shoulder seatbelts;

that directs collision forces away from the vulnerable abdomen to concentrate them on the parts of the child's anatomy best able to assume them such as the bony hips and pelvis;

that encourages and facilitates a snug lap seatbelt fit to minimize a child's free movement in a collision to take maximum advantage of the energy-absorbing capacity of the vehicle, thus reducing the magnitude of the collision force to compensate for her immature skeletal development;

that preserves belt angle in a collision to maintain an adequate downward pressure in the restraint, inhibiting the rotation of the pelvis and arresting the forward movement of the lower body to prevent submarining;

that affords the child an optimal seated position, low and against the rear seatback to reduce the likelihood of an impact with the back of the front seat;

that does not expose the child under any circumstances to direct contact with the adult lap seatbelt alone.

SUMMARY OF THE INVENTION

The present invention satisfies these requirements while avoiding the problems and disadvantages of existing art by providing a belt-positioning and load-transfer device in front of the child to adapt to variations in seatbelt geometry and divert collision forces from where the child is most vulnerable to parts of the body best able to assume them. It also promotes a snug seatbelt adjustment to minimize movement in a collision and take maximum advantage of the vehicle's energy-absorbing characteristics.

In some embodiments, there is provided a child restraint for use in a vehicle having a lap belt and a shoulder belt, the child restraint comprising a device connectable to the lap belt and configured to direct collision forces away from the vulnerable abdomen of the child to the bony hips and pelvis. The restraint of the invention achieves this by directing force in the lap belt downward onto one or more of the thighs and the pelvic spines so as to reduce rotation of the pelvis and the forward movement of the pelvis and femurs during the dynamics of a frontal vehicle impact.

The child restraint is preferably used with a booster seat, and can be independent of a booster seat or associated with a booster seat. The child restraint and the booster, where applicable, are separate but complementary in their functionality.

The child restraint is for use in a vehicle having a lap belt and a shoulder belt, the child restraint comprising a main body part with two side ends which is configured to fit into an area between the abdomen and the thighs when the child is seated. In one embodiment of the invention, the main body part comprises an outer shell, made of a suitable resilient molded plastic, and an inner structural component comprising an integral rigid stiffening member spanning the restraint in a transverse direction. In a further aspect of the invention, either end of the integral rigid stiffening member is configured to maintain proper pelvic orientation.

In another aspect of the invention there is fastening means comprising a clip located on the middle of the main body part which is connectable to the lap belt so as to increase an inclination angle of the lap belt. The fastening part includes a groove configured to receive a section of the lap belt. In an alternate embodiment the fastening means comprises the retaining clip on the middle of the main body part and one retaining clip respectively on either side end of the main body part.

In a further aspect of the invention there is a combination of the child restraint and a booster seat, the combination being a child protection system for use in a vehicle having a lap belt and a shoulder belt.

In still another aspect of the invention, a seat pan of the booster seat is higher at the front than the rear. Further, a seating surface of the seat pan is chosen to maximize friction between the child's clothing and the booster seat.

During the dynamics of a frontal vehicle impact, the child restraint is configured to act in at least one of two ways:

the two side ends of the main body part are held captive in front of the pelvis;

a counter-clockwise rotation of the main body part increases a downward force on the hips and the upper thighs;

in order to inhibit the rotation of the pelvis, prevent the child from sliding forward and reduce the collision forces on the vulnerable abdomen.

In a further aspect of the invention there is a method to protect the child during the dynamics of a frontal vehicle impact, the vehicle having a lap belt and a shoulder belt, the method comprising:

connecting the child restraint to the lap belt;

seating the child on the seat of the vehicle;

fastening the lap belt with the child restraint and the shoulder belt by placing the child restraint against the front of the child's pelvis.

In a further aspect of the method of the invention, the child is seated on a booster seat on the seat of the vehicle. In still another aspect of the method of invention, a seat pan of the booster seat is higher at the front than the rear. Further, a seating surface of the seat pan is chosen to maximize friction between the child's clothing and the booster seat.

BRIEF DESCRIPTION OF THE DRAWINGS

The invention will be better understood by way of the following detailed description of embodiments of the invention with reference to the appended drawings, in which:

FIGS. 5A and 6A are side views of a child restrained by the seat belt alone (FIG. 5A) and sitting on the booster seat and wearing the restraint (FIG. 6A), illustrating the impact of the invention on seatbelt angle ($\theta XZ$) and the corresponding increase in downward pressure on the hips to resist the tendency to submarine;

FIGS. 5B and 6B are sectional views abstracted from corresponding illustrations 5A and 6A illustrating how the invention increases the angle ($\theta XY$) between the lap seatbelt and the axis of the seat bight to allow the belt to be more closely aligned with collision forces;

Figure 1:
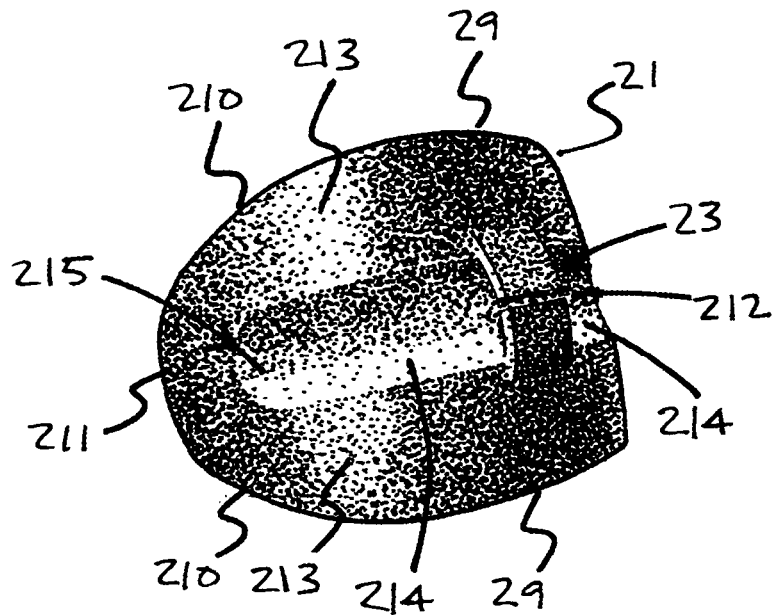
FIG. 1 is a perspective of the exterior shell of the restraint.

DRAWINGS—REFERENCE NUMERALS 21 outer shell
22 inner structural component
23 seatbelt retaining clip
24 restraint middle segment
25 restraint end segment
26 stiffening member
27 concave profile of inner structural member
28 contact surface of truncated stiffening member
29 outer shell parallel edges
210 outer shell tapered edges
211 outer shell edge radii
212 slot, seatbelt retaining clip
213 outer shell convex surface
214 concave seatbelt path
215 seatbelt path termination radius
216 perimeter chamfer of structural component
217 front of booster seat pan
218 seat pan of booster
219 booster interior rib
220 raised edge of booster
221 booster seat component
222 booster fabric pad

DETAILED DESCRIPTION OF THE INVENTION

Figure 2:
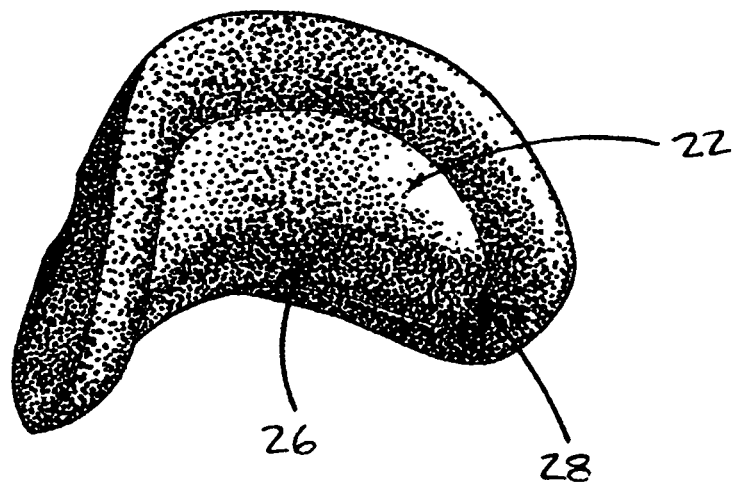
FIG. 2 is a perspective of the interior structural component of the restraint including the transverse stiffening member.
Figure 3:
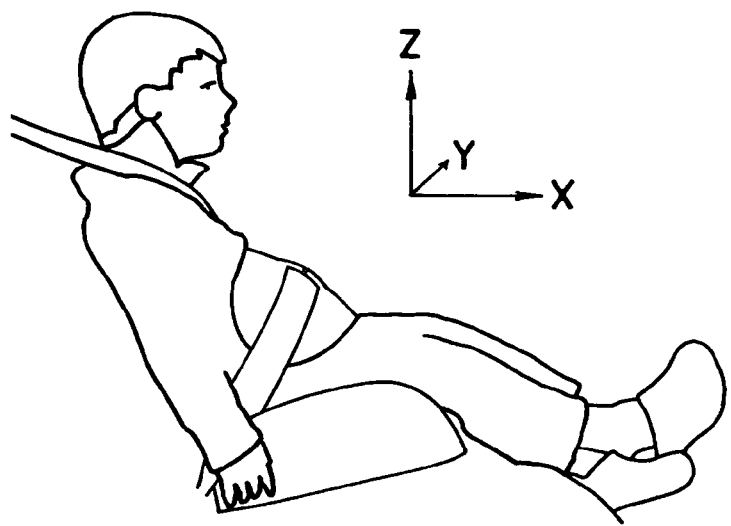
FIG. 3 is a perspective view of the restraint on a child seated on a dedicated booster.
Figure 4:
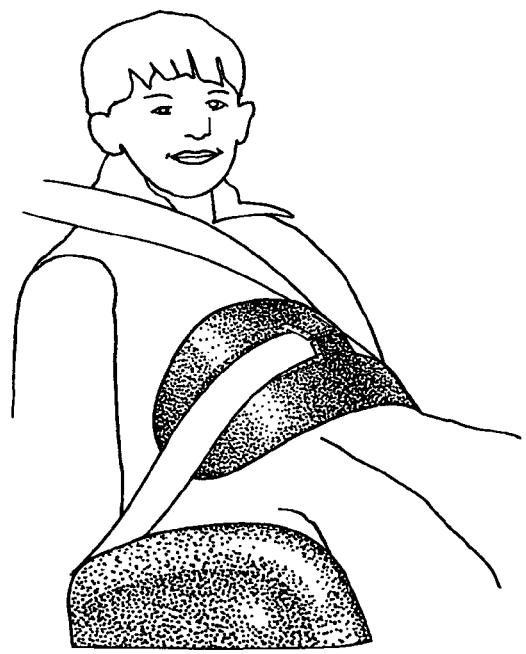
FIG. 4 is a perspective view of the restraint on a child seated on a dedicated booster illustrating the X-, Y- and Z-coordinate axes.

The restraint in its preferred embodiment FIGS. 1, 2 comprises three parts: an outer shell (21) made of a suitable resilient molded plastic over an inner structural component (22) comprising an integral rigid stiffening member (26) and composed of a rigid polymer foam material and a seatbelt retaining clip (23) located on the front of the plastic shell.

Figure 14:
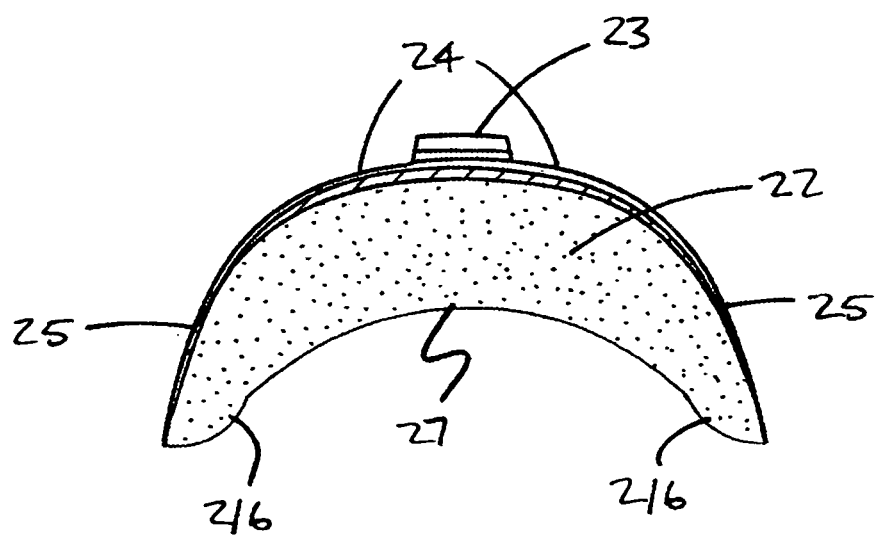
FIG. 14 is a lateral section of the restraint on its plane of symmetry.

When viewed in a transverse section FIG. 14 the exterior of the restraint is convex and symmetrical in relation to the median plane and characterized by three wall segments integrally formed: a wide curved middle segment (24) and side wall segments (25) joined at approximately 45° in relation to the middle segment and approximately half as long as the middle segment is wide.

The exterior shell FIG. 1 is a plastic molding, symmetrical about two perpendicular planes in the form of the aforementioned 'u' with a front portion characterized by roughly parallel upper and lower edges (29) and side portions with tapered upper and lower edges (210) terminating and joining in a large radius (211).

There is a seatbelt retaining clip (23) centrally located on the front of the shell with a slot (212) to permit insertion and removal of the lap seatbelt.

The exterior shell may be thermoformed by means of vacuum over an open mold, in which case the seatbelt retaining clip is a separate molded part which may be installed with the body of the clip held captive between the exterior shell and structural component of the restraint, with the two prongs of the clip protruding through an opening central to the front of the exterior shell.

In an alternative embodiment, the exterior shell is formed under pressure in a closed mold in which case the seatbelt retaining clip may be an integral part of the shell.

The front and side top and bottom exterior surface areas (213) of the exterior shell are slightly convex for additional stiffness and are formed integrally with the middle surface areas (214) on either side of the seatbelt clip which are slightly concave, forming a shallow impression crossing the front of the shell and terminating in a radius (215) on either side, suggesting the path of the seatbelt. These impressions contribute to the initial rigidity of the restraint and provide a predictable failure mode in a collision when the restraint is subject to the extreme pressures exerted by the seatbelt.

The inner structural component comprises an integral rigid stiffening member (26) spanning the restraint in a transverse direction and configured to reliably fix the position of the restraint in relation to the child's body, either end, 'P', FIGS. 8, 9, 10, 12 of the rigid stiffening member being adjacent to the hip bone and pelvic spine on either side of the child.

Figure 13:
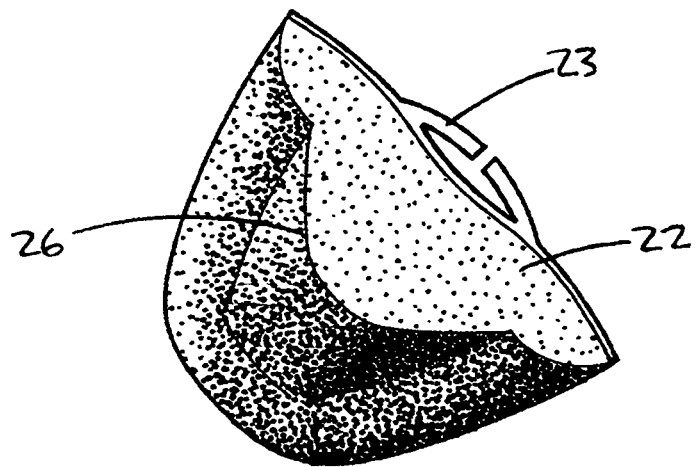
FIG. 13 is a median-plane section of the restraint.

The stiffening member (26) is symmetrical in relation to both the median and the transverse planes of symmetry with the profile of a truncated triangle when viewed in a median-plane section FIG. 13.

The exterior profile of the stiffening member in transverse plane section FIG. 14—(27) is concave and sweeps around the abdomen of the child with the truncated face FIG. 2—(28) of either end poised to make positive contact with and facilitate the transfer of reaction forces FIGS. 8, 9, 10, 11 to the hips and pelvis.

Figure 15:
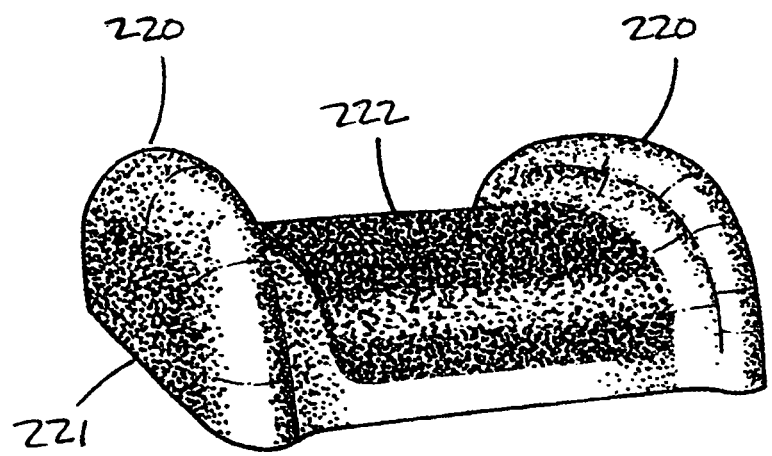
FIG. 15 is a perspective of the booster seat assembly.
Figure 16:
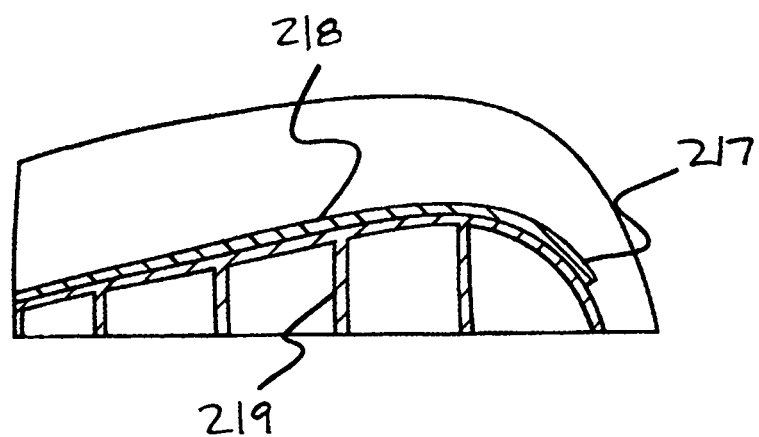
FIG. 16 is a median-plane section of the booster seat assembly.

Referring to FIGS. 15, 16, the seat pan of the booster is low and wedge-shaped in profile, the seating surface (218) being higher at the front than the rear. The surface is roughly flat in the centre and concave towards the sides and rear for a more uniform distribution of the pressure on the child's buttocks and curved downwards along the front (217) to avoid areas of concentrated pressure on the child's thighs.

Either side (220) of the molded seat is raised in the mode of a seat bolster in a sports/racing car for the comfort and support of the child and to convey the high performance character of the product.

The booster comprises a molded polymer seat component (221). The interior of the molded seat may have a lattice of ribs to maintain the integrity of the seat when subjected to the downward reaction force of a collision.

In one embodiment of the invention the underside of the seat component is covered by a flat panel so the exterior walls and interior ribs do not mar the upholstery of the vehicle. The panel may be located on the seat component by means of positive male features integral to the panel and corresponding negative female features in the interior lattice structure of the seat component. The panel may incorporate Isofix/LATCH connectors to affix the seat securely to the frame of the vehicle.

In an alternative embodiment of the invention there are features on either side of the booster to prevent its forward translation in a collision by means of the lap seatbelt, these features also serving as arm rests.

The seating surface may be covered by a textured fabric pad (222), securely fastened. The fabric shall be heavy-weight woven pile polyester, chosen to maximize friction between the child's clothing and the seat.

Operation

The invention restrains the child by creating the optimal conditions for the translation of the horizontal inertia of the her body acting on the lap seatbelt into downward reaction forces in the restraint to hold her tight between the restraint and the low booster.

The restraint serves as a protective exoskeleton, bridging the vulnerable abdomen in a lateral direction and targeting reaction forces on the pelvic spines and the hips with either end of its wedge-shaped interior profile.

The restraint and the booster together compensate for variations in lap seatbelt geometry by simulating the lower torso of an adult passenger to achieve a snug lap seatbelt adjustment and raise and advance the point of action of the lap seatbelt relative to the child.

In cases where lap seatbelt anchor points are either too high or too far forward for a child, the invention improves lap seatbelt fit and performance—without moving the child away from the seatback and only minimally elevating her—by advancing and raising the point of contact between the belt and the child FIGS. 5A, 6A.

This avoids the disadvantage of the belt-positioning booster of significantly raising and advancing the child, thereby increasing free movement and the risk of impact with a forward surface in a collision.

In raising the point of contact between the seatbelt and the child in relation to the seatbelt anchor locations FIGS. 5A, 6A, the restraint, in conjunction with the tapered booster increases the belt angle ($\theta XZ$) to increase downward pressure on the hips and reduce the risk of the child sliding forward under the belt in a collision.

Figure 7:
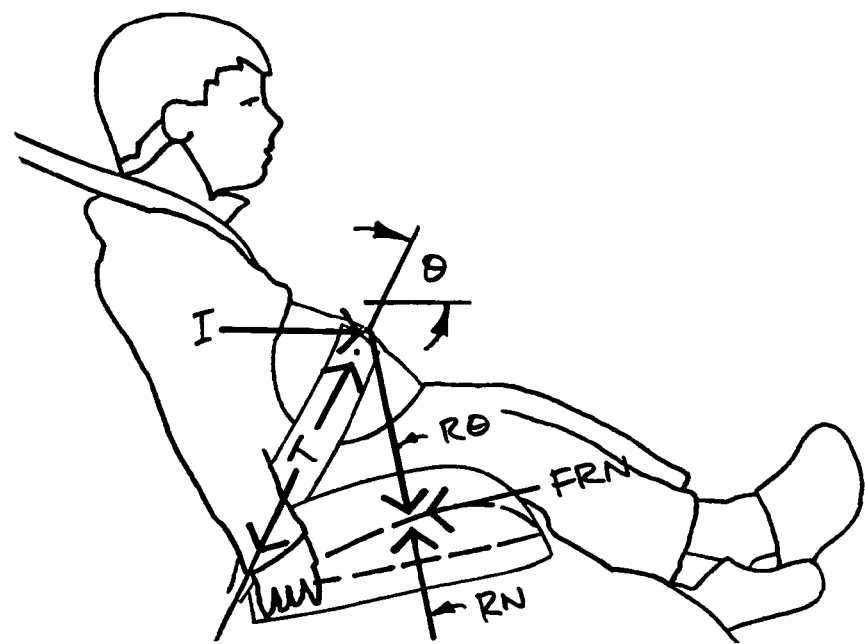
FIG. 7 is a side view of the restraint on a child seated on a dedicated booster seat illustrating diagrammatically how the inertia (I) of the child's torso in a forward impact produces a tension (T) in the lap seatbelt and a downward reaction force (R$\theta$) proportional to the angle ($\theta$) of the lap seatbelt in relation to the horizontal, resulting in a corresponding reaction force in the booster seat (RN) and a proportional friction force (FRN) opposing the tendency of the child's lower body to slide forward.

The booster provides the stage for the translation of the elevated downward reaction force into the increased friction force (FRN)—FIG. 7 opposing forward collision forces, isolating the pelvis from the inertia of the legs.

The booster FIG. 15 also enables the child to bend her legs at the knee in order to assume the optimal seated position, low and against the back of the rear seat of the vehicle, critical to the collision performance of the invention.

A snug seatbelt adjustment is necessary to minimize free movement in a collision and take maximum advantage of this optimal seated position. The restraint improves lap seat adjustment by adding its thickness to the cross-sectional area of the child the belt wraps around FIGS. 5B, 6B.

It thus increases the angle ($\theta XY$) in the X-Y plane between the lap seat belts and the axis of the seat bight on either side to bring the belts into a better alignment with collision forces, thereby allowing them to be adjusted more snugly and increasing their efficiency.

The invention thus supports the role of the pelvis in restraining the child by promoting proper pelvic orientation at the onset of a collision and by isolating the pelvis from the collision forces promoting its counter-clockwise rotation.

The restraint translates horizontal collision forces into a compressive reaction force focused on the pelvic spines and the hips to arrest the forward movement and counter-clockwise rotation of the pelvis. It does this by means of a reaction force due to an internal moment in the device.

Figure 8:
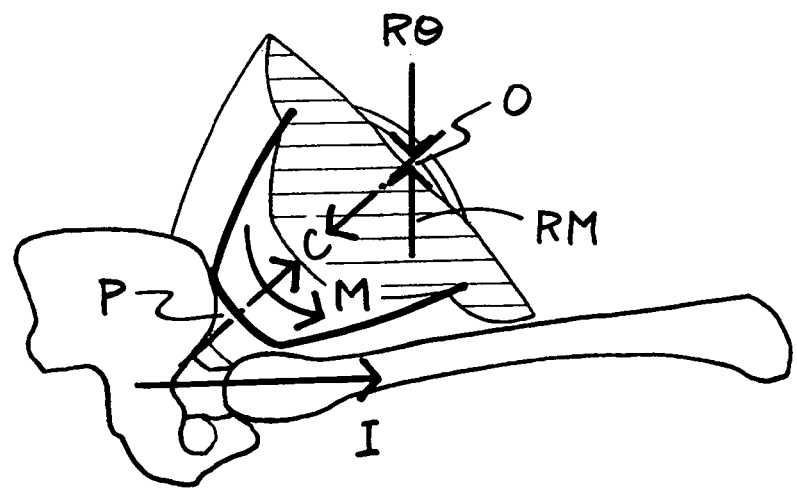
FIG. 8 is a median-plane section of the restraint illustrating diagrammatically how the inertia (I) of the child's legs and lower abdomen induces a moment (M) about an axis (O) through the point of contact of the lap seatbelt with the restraint producing an upward reaction force (RM) whose opposition to the downward reaction force (R$\theta$) results in a compressive reaction force (C) acting along the axis defined by point O and a point (P), P being the point of contact of either end of the transverse stiffening member with the corresponding surfaces of the upper femurs and pelvic spines.

In a forward collision FIG. 8 the restraint creates an opposition between
  (i) the downward reaction force (R$\theta$) due to the forward inertia of the upper body acting upon the lap seatbelt with a diagonal inclination $\theta$, and
  (ii) an upward reaction force (RM) resulting from a counter-clockwise moment (M) about an axis through the most forward point of contact of the belt with the restraint (O) due to the inertia (I) of the legs.

The opposing reaction forces are expressed as a combined compressive reaction force (C) concentrated on the pelvic spines and the hips, which may be understood as a follows:
  Raising the point of contact of the seatbelt with the restraint at point O relative to the point of contact (P) of the restraint with the child's hips and pelvis results in the counter-clockwise moment M about point O due to the inertial force I of the legs;
  Merely raising the point of contact of the seatbelt with the restraint without also advancing point O relative to point P does not produce the upward reaction force RM however;
  By advancing point O in relation to point P, in order for moment M to produce a counter-clockwise rotation of the restraint it must displace point O upward by a distance FIG. 9—($\Delta z$) producing a vertical reaction force FIG. 8—RM acting upward in opposition to R$\theta$, thus augmenting and transforming the otherwise vertically downward expression of R$\theta$ into the compressive reaction force C acting along the axis O-P.

Figure 9:
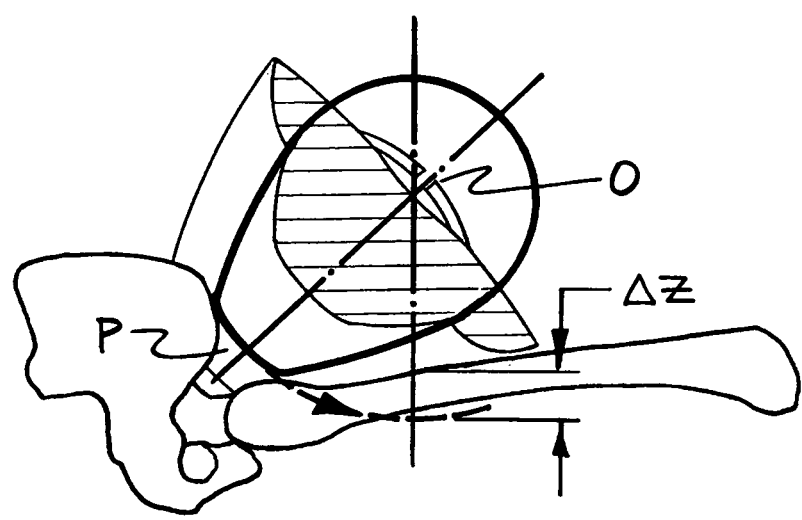
FIG. 9 is a median-plane section of the restraint illustrating diagrammatically the 'cam' action of the restraint wherein the reaction force RM of FIG. 8 acts upward in opposition to Rθ, thus augmenting and transforming the otherwise vertically downward expression of Rθ into the compressive reaction force C acting along the axis O-P.
Figure 10:
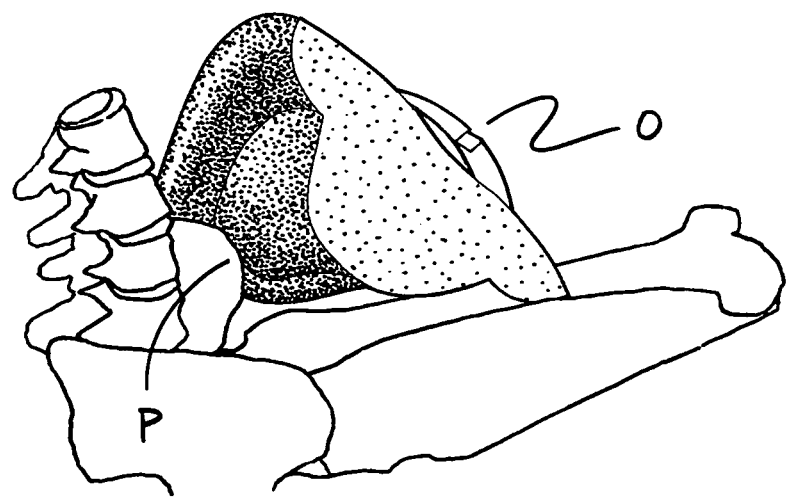
FIG. 10 is a perspective view of one half of the restraint sectioned in the median plane illustrating the contact between one end of the transverse stiffening member and the pelvic spine and upper femur of the skeleton of a child.
Figure 11:
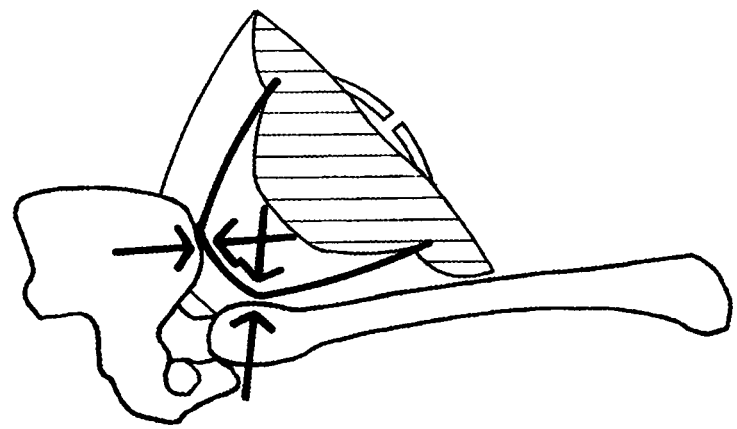
FIG. 11 is a median-plane section of the restraint shown in diagrammatic relation to of the skeleton of a child illustrating the compressive reaction forces between either end of the transverse stiffening member and the corresponding upper femur and pelvic spine.
Figure 12:
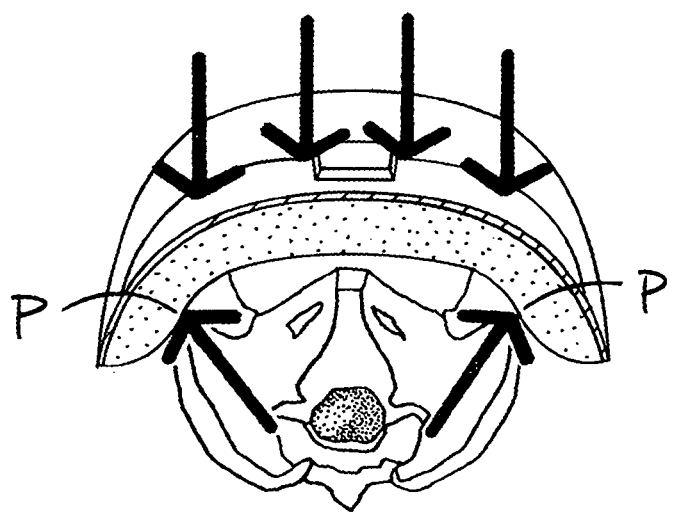
FIG. 12 is a lateral section of the restraint on its plane of symmetry viewed obliquely and shown in relation to the pelvis of a child.

The restraint thus functions FIG. 9 as a cam rotating about an axis through its point of contact with the lap seatbelt O, with either end P of the transverse stiffening member the lobes of the cam, distributing the compressive reaction force between O and P over the forward edge of the pelvic spine and the top of the upper thigh over the hip joint on either side of the child FIGS. 9, 10.

The stiffening member thus serves both structural and mechanical purposes.
  Structurally, it:
  preserves the geometry of the restraint in the X-Z plane by preventing its collapse in a collision;
  acts as a bulkhead in the Y-Z plane, spanning and protecting the child's vulnerable abdomen from horizontal collision forces;
  Mechanically, it:
  serves at either end at P to augment and concentrate reaction forces on the front of either pelvic spine and the hips through a cam action about an axis through the point of contact O of the lap seatbelt with the restraint FIGS. 8, 9, 10.

The booster provides the stage FIG. 7 on which the downward reaction force Rθ in the restraint translates into the frictional force FRN opposing the forward movement of the child and relieving pressure on the pelvis due to the inertia of the child's legs.

The seat pan FIG. 16—(218) of the booster is taller at the front than the rear to allow the child to bend her legs at the knee. The rear of the seat pan of the booster is substantially lower than a conventional belt-positioning booster and its gentle rearward slope encourages her to sit comfortably with her back against the seatback of the car without slouching.

This lower seating position is possible because it is the seatbelt positioning aspect of the restraint in lieu of a high booster which increases lap seatbelt angle by raising the point of contact of the seatbelt with the child in relation to the seatbelt anchor locations.

The upright seating position promoted by the booster of the invention promotes optimal pelvic orientation and seatbelt adjustment to minimize the free movement of the child's body in the event of a forward collision, reducing the rotation of the lap seatbelt about its anchors to preserve belt angle and coupling the child more securely to the vehicle to exploit its capacity to absorb the energy of the collision forces.

Use of the invention does not diminish the crucial role of the shoulder seatbelt, nor does it preclude use of a device to provide an optimal shoulder belt fit for a smaller child if necessary.

Should the shoulder belt nonetheless not serve its purpose, as may occur when the child 'jack-knifes' in an off-centre collision, the restraint will reduce the severity of belt-inflicted abdominal injuries.

Advantages

In a collision the invention extends a greater margin of protection to a child passenger relative to a traditional belt-positioning booster in several distinct ways:

1. by placing the belt-positioning feature ahead of the child it is able to optimize the child's seating position, low and against the back of the rear seat of the vehicle, as far from the vehicle's front seat as possible, thus putting her at the least possible risk of impact with that surface in the event of a collision;
2. in situating the child low and against the back of the rear seat of the vehicle it reduces her unrestrained forward translation in the event of a collision to more fully exploit the vehicle's capacity to absorb the energy of the collision forces;
3. as a belt-positioner the invention promotes a snug seatbelt adjustment and brings the belts into a better alignment with collision forces by increasing the angles (θXY) between the seatbelts and the seat bight, to preserve her optimal seated position to the full extent possible;
4. by optimizing the child's seating position and facilitating a snug seatbelt adjustment the invention promotes proper pelvic orientation at the outset and during a collision;
5. as a belt-positioner and load-transfer device, it increases the angle (θXZ) of the lap seatbelt in relation to the horizontal collision forces to increase the downward force on the upper thighs, increasing the friction between the child and the booster to isolate the pelvis from the inertia of the legs;
6. by situating the child low and against the back of the rear seat of the vehicle and reducing the child's forward translation in a collision, the rotation of the lap seat belt about their anchors is reduced and the angle (θXZ) of the lap seatbelt in relation to the collision forces is better preserved;
7. as a load-transfer device, it translates forward collision forces into a compressive reaction force in its transverse stiffening member through the opposition of a downward reaction force due to the forward inertia of the upper body acting upon the lap seat belt, and an upward reaction force resulting from a counter-clockwise moment due to the inertia of the legs, targeting the combined compressive reaction forces on the pelvis and the hips to stabilize and arrest both the forward translation and the counter-clockwise rotation of the pelvis.

Alternative Uses and Embodiments of the Restraint

The restraint may either comprise an outer shell and an inner structural component or be rotationally-molded with the respective exterior surfaces areas of the exterior outer shell and the inner structural component integrally formed to create a hollow plastic shell. The shell may be filled with foam for additional rigidity.

Figure 17:
FIG. 17 is a perspective view of the restraint on a child seated on a high-back belt-positioning booster seat.

The restraint may be used either with a dedicated booster or in combination with a suitable third-party booster seat of either the backless or high-back variety FIG. 17.

Where the restraint is used in relation to a booster seat it may be combined with the booster seat by fastening means other than the lap seatbelt with the lap seatbelt passing in front of the restraint but not attached to the restraint.

Figure 18:
FIG. 18 is a perspective view of the restraint on a child seated directly on the vehicle seat without use of a booster.

The restraint may also be used independently of a booster by an older child who is tall enough she is able to bend her legs at the knee to sit comfortably on the vehicle seat with her back against the back of the seat without slouching FIG. 18.

Although intended primarily for children who have graduated from child car seats but are not sufficiently mature to use a lap seatbelt without serious risk of injury, application of the restraint need not be limited to children up to the age of ten years and may be extended to adolescents and adults including pregnant women.

Figure 19:
FIG. 19 is a perspective view of a smaller variant of the restraint on a child seated on a dedicated booster.
Figure 20:
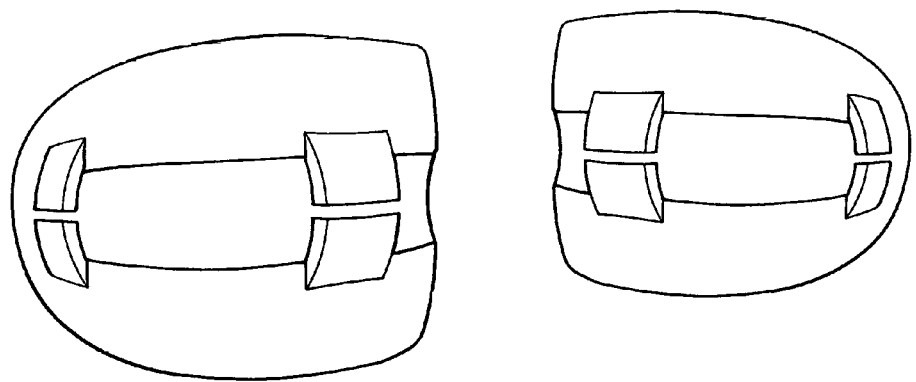
FIG. 20 is a perspective view depicting the retaining clips on either side wall of the invention.

Application of the restraint need not be limited to use in passenger vehicles and its compact size, portability and light weight make it suitable for use anywhere children would otherwise be protected only by a lap seatbelt such as on aircraft.

Where the requirement for protection from the lap seatbelt may not be as acute, such as in the case of an older child, a reduced variant of the restraint FIG. 19 may serve a more limited purpose: by reducing its extent and coverage of the body, as viewed in a median plane section, although the belt-positioning function of the device may be compromised including the ability of the device to concentrate collision forces on the hips and pelvis by means of an internal moment, some functionality is retained including a limited capacity of the device to span and protect the abdomen of the passenger to direct collision forces to the hips and pelvic spines.

What is claimed is:

1. A child restraint for use in a vehicle having a lap seat belt and a shoulder seat belt, the child restraint comprising:
   a. a main body part comprising a middle and two side wall segments, said main body part configured to be positioned in front of and on either side of a child;
   b. said wall segments having exterior outer surfaces which are continuous and generally convex;

c. a rigid inner stiffening member spanning the restraint transversely and configured to reliably fix the position of the restraint in relation to the child's body;

d. either end of said rigid inner stiffening member configured to be positioned adjacent to the hip bone and pelvic spine on either side of a child;

e. a fastener connectable to the lap seat belt comprising a clip on the middle of said middle wall segment of said main body part;

f. said fastener so displaced in relation to the child by said rigid inner stiffening member that when the restraint is placed on a child and the lap seat belt is passed through said fastener and the lap seat belt is raised and the vertical inclination of the lap seat belt is increased, whereby when the lap seatbelt is subject to the inertial force of a child's body in a forward collision producing a downward reaction force in the lap seat belt, g. either end of said rigid inner stiffening member is configured to concentrate the reaction force on the hip bone and in front of the pelvic spine on either side of the child, in order to inhibit the rotation of either pelvic spine and the forward movement of the child.

2. A child restraint as claimed in claim 1, wherein either end of said rigid stiffening member of the child restraint is configured to maintain proper pelvic orientation.

3. A child restraint as claimed in claim 1, wherein in addition to said fastener connectable to the lap seat belt comprising a clip on the middle of said middle wall segment of said main body part there is a fastener on either said side wall segment of said main body part each including a retaining clip respectively.

4. A child restraint as claimed in claim 1, comprising:
a. an outer shell, made of a suitable resilient molded plastic and,
b. an inner structural component, molded in a rigid polymer foam material.

5. A child protection system comprising the combination of a child restraint as claimed in claim 1 and a booster seat, said child protection system being for use in a vehicle having a lap seat belt and a shoulder seat belt.

6. A child protection system as claimed in claim 5, wherein a seat pan of said booster seat is higher at the front than the rear.

7. A child protection system as claimed in claim 5 wherein a seating surface of said booster seat maximizes friction between the child's clothing and the booster seat.

8. A method to protect a child in a vehicle during the dynamics of a frontal impact, said vehicle having a lap seat belt and a shoulder seat belt, the method comprising:
a. connecting a child restraint as claimed in any one of claims 1, 2, 3 and 4 to the lap seat belt;
b. seating the child on the seat of the vehicle;
c. placing the child restraint against the front of the child's pelvis, fastening the lap seat belt with the child restraint and positioning the shoulder belt.

9. A method as claimed in claim 8, wherein the child is seated on a booster seat on the seat of the vehicle.

10. A method as claimed in claim 9, wherein a seat pan of said booster seat is higher at the front than the rear.

11. A method as claimed in claim 9 wherein a seating surface of said booster seat maximizes friction between the child's clothing and the booster seat.

* * * * *